United States Patent
von Haden et al.

(10) Patent No.: US 9,122,766 B2
(45) Date of Patent: Sep. 1, 2015

(54) REPLACEMENT TIME BASED CACHING FOR PROVIDING SERVER-HOSTED CONTENT

(75) Inventors: Kyle Matthew von Haden, Mill Creek, WA (US); Ryan Patrick Heaney, Seattle, WA (US); Neculai Blendea, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 166 days.

(21) Appl. No.: 13/604,638

(22) Filed: Sep. 6, 2012

(65) Prior Publication Data

US 2014/0067913 A1    Mar. 6, 2014

(51) Int. Cl.
    G06F 15/16   (2006.01)
    G06F 12/08   (2006.01)
    G06F 17/30   (2006.01)
    H04L 29/08   (2006.01)

(52) U.S. Cl.
    CPC .... *G06F 17/30902* (2013.01); *H04L 29/08801* (2013.01); *H04L 67/2852* (2013.01)

(58) Field of Classification Search
    CPC .............. H04L 67/2852; H04L 29/08801; G06F 17/30902
    USPC ........................................................ 709/203
    See application file for complete search history.

(56) References Cited

U.S. PATENT DOCUMENTS

| | | | |
|---|---|---|---|
| 6,591,266 B1 | 7/2003 | Li et al. | |
| 6,868,439 B2 * | 3/2005 | Basu et al. | 709/213 |
| 2002/0083148 A1 | 6/2002 | Shaw et al. | |
| 2002/0154639 A1 * | 10/2002 | Calvert et al. | 370/400 |
| 2003/0214949 A1 * | 11/2003 | Shaikli | 370/394 |
| 2006/0064467 A1 | 3/2006 | Libby | |
| 2006/0069746 A1 | 3/2006 | Davis et al. | |

(Continued)

FOREIGN PATENT DOCUMENTS

| | | | |
|---|---|---|---|
| EP | 1868312 A1 * | 12/2007 | |
| EP | 2141890 A1 * | 1/2010 | |
| JP | 2009188508 A * | 8/2009 | |

OTHER PUBLICATIONS

"Web Cache Settings", Retrieved at <<http://mobilehelp.cymphonix.com/Advanced/Content/User%20Guide/UI%20Tabs/Admin%20Tab/2c_f_WebCacheSettings.htm, Retrieved Date: Jul. 2, 2012, pp. 3.

(Continued)

*Primary Examiner* — Kostas Katsikis
(74) *Attorney, Agent, or Firm* — Steve Crocker; Danielle Johnston-Holmes; Micky Minhas

(57) ABSTRACT

A system is provided in which two sets of content are cached in a corresponding two caches—a current cache and a next cache. A client renders content in the current cache and uses the next cache to define the expiration for the content in the current cache as well as provide the replacement content when the current content expires. When a client application renders the content in the current cache, the application checks whether the expiration for the current cache has been reached according to the expiration defined by the content in the next cache (which is not being rendered). If the expiration has been reached, the content in the next cache is moved to the current cache and rendered. New content can then be downloaded to fill the next cache and define the expiration for the content formerly in the next cache but now in the current cache.

20 Claims, 6 Drawing Sheets

(56) References Cited

U.S. PATENT DOCUMENTS

| | | | |
|---|---|---|---|
| 2006/0075110 A1* | 4/2006 | Seraphin | 709/227 |
| 2007/0005606 A1* | 1/2007 | Ganesan et al. | 707/10 |
| 2007/0277102 A1* | 11/2007 | Kanzaki | 715/540 |
| 2009/0077173 A1* | 3/2009 | Lowery et al. | 709/203 |
| 2009/0204753 A1* | 8/2009 | Bridge et al. | 711/106 |
| 2010/0235321 A1* | 9/2010 | Shukla et al. | 707/610 |
| 2010/0274857 A1* | 10/2010 | Garza et al. | 709/206 |
| 2011/0153839 A1* | 6/2011 | Rajan et al. | 709/227 |
| 2011/0289533 A1* | 11/2011 | White et al. | 725/46 |
| 2012/0109902 A1* | 5/2012 | Rozensztejn et al. | 707/689 |
| 2012/0144092 A1* | 6/2012 | Hsieh et al. | 711/103 |
| 2012/0331228 A1* | 12/2012 | Shatz et al. | 711/118 |

OTHER PUBLICATIONS

Yuan, et al., "Proxy+: Simple Proxy Augmentation for Dynamic Content Processing", Retrieved at <<http://2003.iwcw.org/papers/yuan.pdf>>, Proc. of the 8th International Workshop on Web Caching and Content Distribution(WCW'03), Sep. 2003, pp. 12.

"Chapter 1. EXT: Cache Expire", Retrieved at <<http://typo3.org/extension-manuals/cacheexpire/0.4.0/view/1/1/>>, Retrieved Date: Jul. 2, 2012, pp. 2.

* cited by examiner

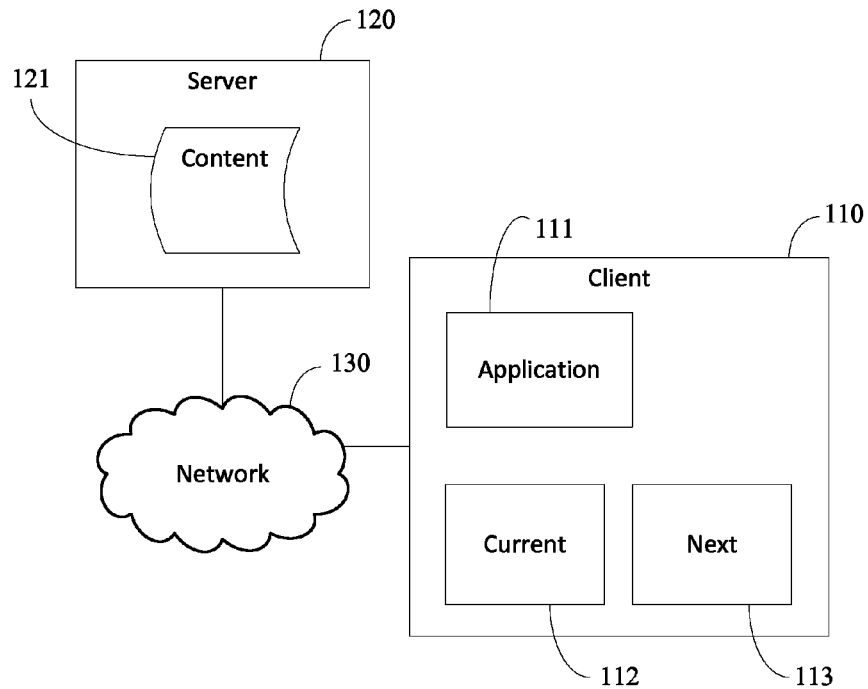
FIG. 1
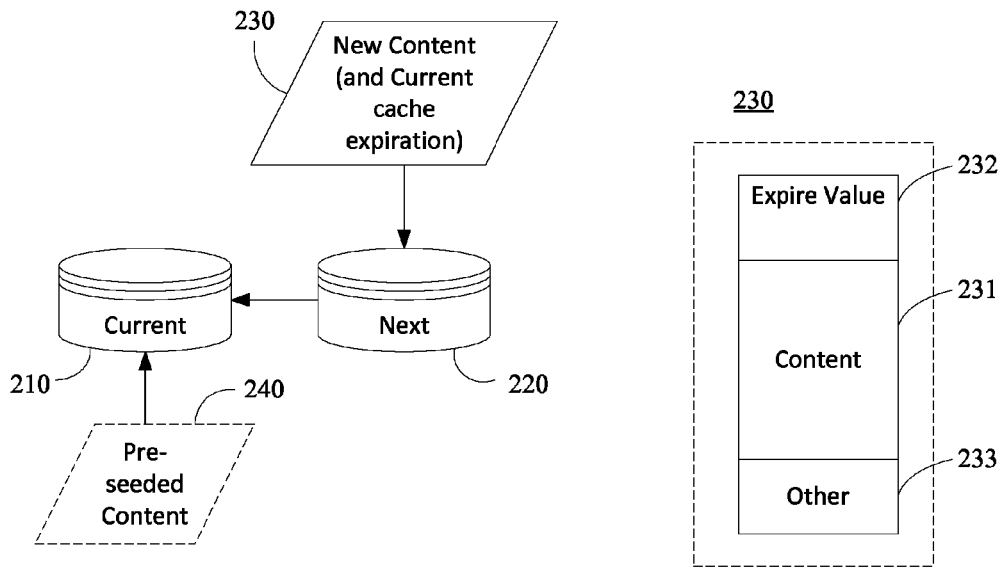
FIG. 2A  FIG. 2B

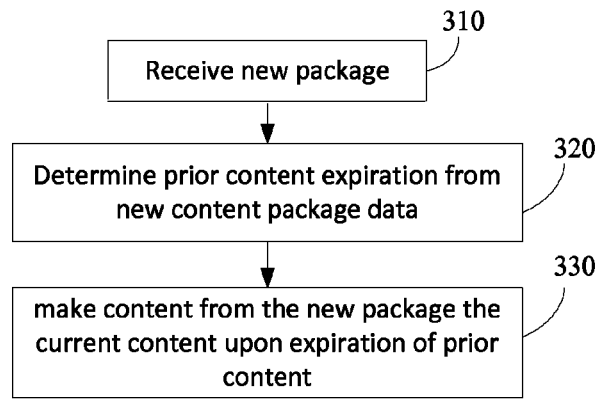
FIG. 3
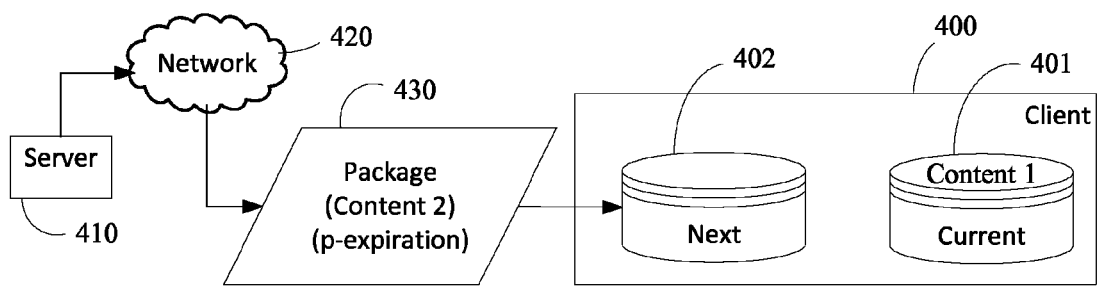
FIG. 4A
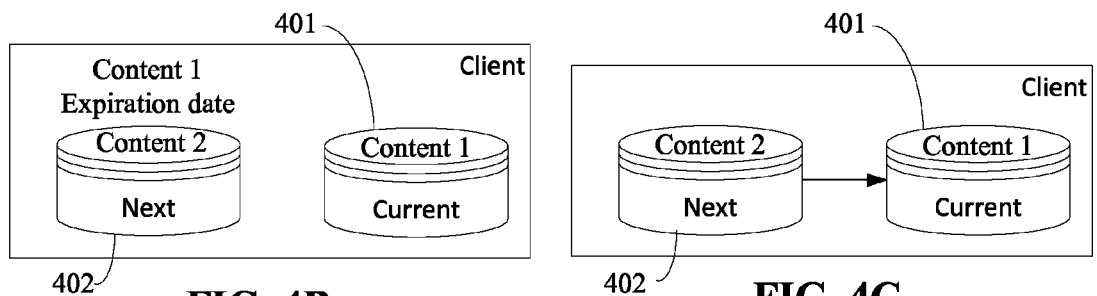
FIG. 4B  FIG. 4C
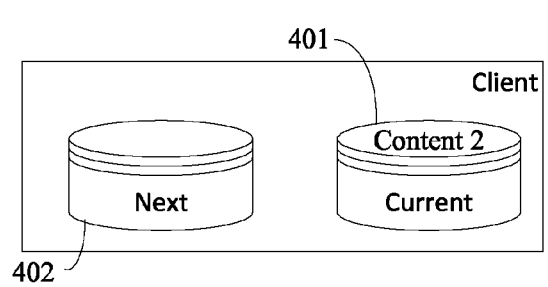
FIG. 4D

REPLACEMENT TIME BASED CACHING FOR PROVIDING SERVER-HOSTED CONTENT

BACKGROUND

As faster data speeds become more ubiquitous, a user's expectation for a seamless and fast presentation of server-hosted content increases. To manage the number of repeat requests for content being downloaded over a network from a server onto a client device as well as to provide the content offline or immediately available for rendering, caching is often used to provide a local copy of the content at (or near) the client device.

In general, caching online content generally follows a time-to-live (TTL) caching (which sets an amount of time for the content being downloaded to be valid before expiring) or a time of expiration approach (which sets a particular date and time after which the content is considered expired/invalid) to turn over into new content. However, when caching online content for client rendering, these typical TTL and time of expiration approaches may not be able to be consistently predictable (turn over into new content at logical times) and workable with irregular usage by the client (where the client isn't launched on a regular basis).

BRIEF SUMMARY

Systems and techniques are provided in which content does not define its own expiration but instead defines the expiration of content that is ahead of itself in a cache queue. For example, an expiration for content that is currently rendered can be defined by a subsequent content in a cache queue. Content in a cache can be considered valid until content which can replace it is in place.

According to certain embodiments, when a package of content is received over a network by a client device, the content from the package is stored in a next cache and an expiration value provided with the package is used to assign an expiration to content in a current cache that is being rendered. In accordance with various embodiments, to establish an expiration of content that is currently rendered, two sets of content are present. Of the two sets of content, one set is the valid content stored in the current cache and the other set is an available replacement content stored in the next cache and defines the expiration of the valid content of the current cache.

According to one aspect, a user's experience does not involve expired content in which a client must wait for new content or the client must render old content while the client retrieves new content and then makes a switch over to the new content at an inopportune time.

According to another aspect, predictable turnover of quickly loaded content can be provided for a desirable user experience even when a client application is not launched on a regular basis.

According to yet another aspect, content being rendered will remain valid at least until new content is ready and downloaded because the content does not self-define its expiration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 shows an operating environment in accordance with an embodiment of the invention.

FIG. 2A illustrates data flow in an operating environment in accordance with an embodiment of the invention.

FIG. 2B shows a representation of a data package in accordance with an embodiment of the invention.

FIG. 3 shows a method for replacement time based caching in accordance with an embodiment of the invention.

FIGS. 4A-4D illustrate data flow when performing replacement time based caching in accordance with an embodiment of the invention.

DETAILED DESCRIPTION

Figure 5:
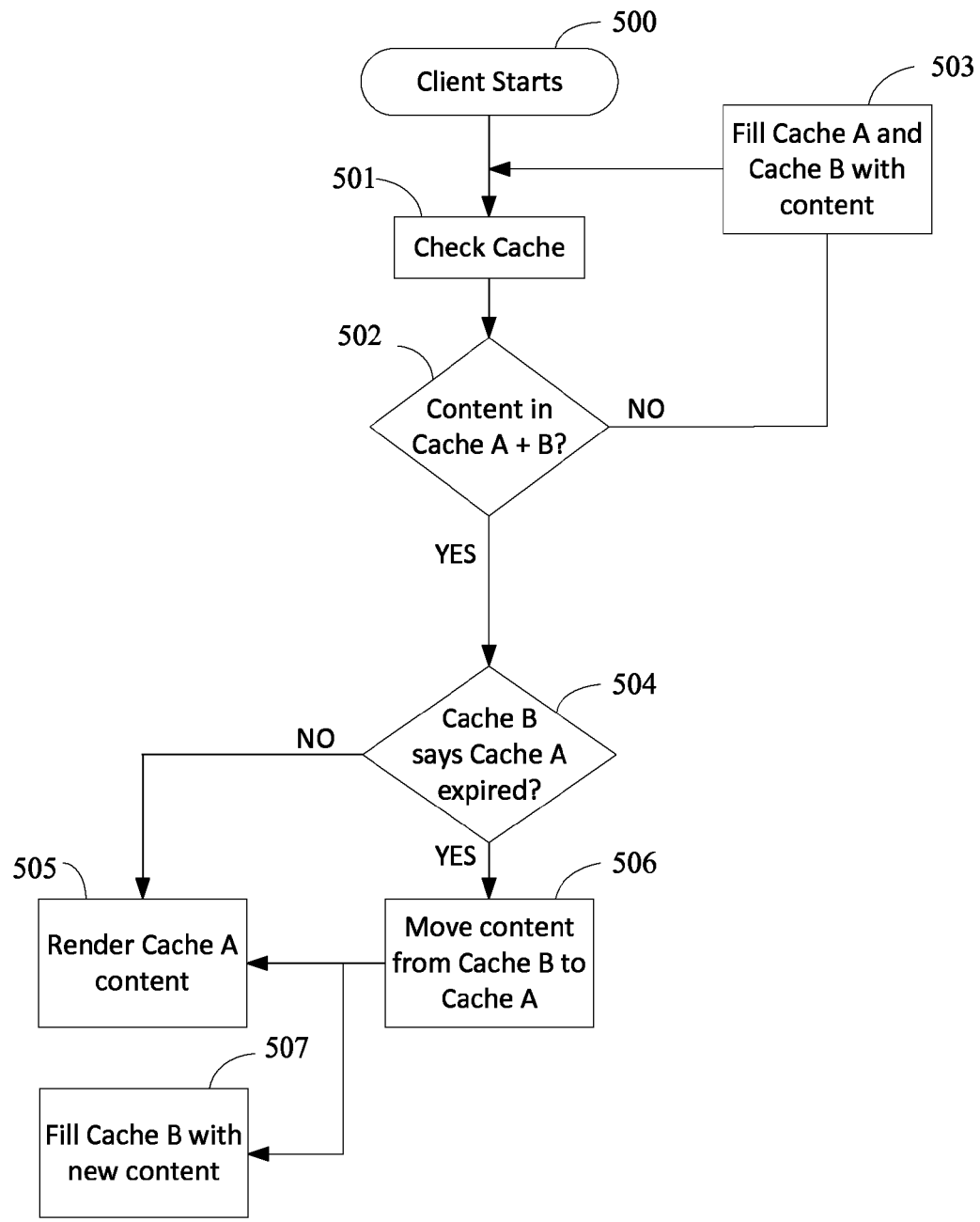
FIG. 5 shows a process flow of a system using replacement time based caching in accordance with an embodiment of the invention.

In accordance with various embodiments of the invention, systems and techniques are provided in which content does not define its own expiration but instead defines the expiration of content that is ahead of itself in a cache queue, for example, the content that is currently rendered.

"Rendering" refers to the converting of content, which may be in the form of coded data, into a format that can be used. Rendered content can be a format used for displaying the content or of a format useable to perform some other predefined action. Rendered content can include graphics as well as text.

Most content includes an expiration date because it is expected that resources from an entity providing content that are available online (e.g., from a website) or otherwise accessible over a network will have updates or change over time. Although some resources change infrequently and have a long expiration date, many applications expect updates and changes to online content.

Embodiments of the invention are applicable for client use with both static and dynamic server-hosted content. "Dynamic" content refers to content that may be customized for an individual user or that changes over time; "static" content refers to content that may be the same for all users or does not change. Where dynamic server-hosted content is available, applications may connect to an online service to download updates, functionality, and/or additional content. For example, a word processing application may download new fonts or document templates. A presentation application may download new slide presentation themes. In addition, background images and themes may be downloaded to change visuals and/or sounds on a client device.

Content received by a client over a network can be stored in a cache for local access by a client application. A "cache" refers to a defined portion of a memory that is easily and/or quickly accessible by a processor. In accordance with certain embodiments, the memory on which the cache is defined does not necessarily need to be located in direct proximity to the processor and may be coupled to the processor via a wired or wireless connection. According to one embodiment, the cache does not need to be physically part of a user's device so long as the network over which the data from the cache must travel enables a fast load and rendering time.

Caching of content received by a client from a server over a network enables efficient rendering because, while the content is valid, the client does not need to request a copy from the server each time a client application launches (or attempts to access the content during other operations).

Content sent from a server for use by a client can be provided in a form of a package. As used herein a "package" refers to the grouping of data including content that is received by a client for use as a unit. The package may be sent over a network in multiple packets or other sets of data that can be transmitted via various network protocols; however, the complete message (including content) intended to be sent from the server for use by a client is referred to as the package.

Server-hosted content refers to content that is stored on a server and can be provided as a Web service, Cloud-based service, file transfer service (e.g., via FTP) or other online or network-based service. Server-hosted content can include, but is not limited to, web content (e.g., a webpage, data, or services), cloud-based content (e.g., data or services), and downloadable files such as from a file server.

FIG. 1 shows an operating environment in accordance with an embodiment of the invention. Referring to FIG. 1, a client 110 and a server 120 communicate via a network 130.

The client 110 and the server 120 can involve computing systems configured with one or more central processing units (CPUs), memory, mass storage, and I/O devices (e.g., network interface, user input device). Elements of the computing system can communicate with each other via a bus. The hardware platform of computing systems can be embodied in many forms including but not limited to, a personal computer, a server computer, a hand-held or laptop device, a multiprocessor system, a microprocessor-based system, programmable consumer electronics, and a distributed computing environment that includes any of the above systems or devices.

In certain embodiments, the client 110 can be embodied as a computing device including, but not limited to, a personal computer, a tablet, a mobile device, a personal digital assistant (PDA), a smartphone, a laptop (or notebook or netbook) computer, a gaming device or console, a desktop computer, or a smart television.

In certain embodiments, the server 120 can be embodied as a computing device including, but not limited to, a server computer, an enterprise computer, a personal computer, a multiprocessor system, a microprocessor-based system, and a combination thereof. It should be understood that the listing of client computing devices and the server computing devices is not intended to be limiting and that the client and server may be embodied in the same or different form.

Communication between computing devices in a client-server relationship may be initiated by a client sending a request to the server asking for access to a particular resource or for particular work to be performed. The server may subsequently perform the actions requested and send a response back to the client.

In accordance with certain embodiments of the invention, the network 130 may be any suitable communications network including, but not limited to, a cellular (e.g., wireless phone) network, the Internet, a local area network (LAN), a wide area network (WAN), a WiFi network, or a combination thereof. Such networks may involve connections of network elements, such as hubs, bridges, routers, switches, servers, and gateways. The network 130 may include one or more connected networks (e.g., a multi-network environment) including public networks, such as the Internet, and/or private networks such as a secure enterprise private network. As will be appreciated by those skilled in the art, communication networks can take several different forms and can use several different communication protocols.

In one embodiment, the server can host content 121 for an application 111 running on the client 110. The server 120 can host a library of content 121 and may include, but is not limited to, a file store or a database storing downloadable application content. The content 121 can be arranged in any suitable unit or set for a particular application to which it is directed. The unit or set of content 121 can be provided to a client 110 in the form of a package such as package 230 shown in FIG. 2B that includes the content 121 and other data or metadata. The package 230 can include information for expiring a prior data package, the content 121, and optionally other data such as information for checking whether the content 121 is to be updated/modified.

Downloadable application content can include a manifest of metadata for content. The content provided, for example by the metadata, can include, for example, one or more templates for a word processing application. Other examples of content include skins (e.g., a custom graphical layout or theme) for a graphical user interface for any suitable software, and images that may be used for a rotating desktop background for an operating system. Another example is an advertisement or demo of a featured game for use in a gaming system. Yet another example is a set of slideshow presentation templates or themes for use in a presentation application. And yet another non-limiting example is a daily message or tip for a media or design application.

The client 110 includes at least one application 111 and a current and next cache 112, 113. The current cache 112 is filled first, either by pre-seeded content or a one-time synchronous call to fill the cache with content. The content in current cache 112 does not have a defined expiration. Instead, when content is provided to the next cache 113, an expiration value provided with the content indicates the expiration of the content in the current cache 112. The expiration value can be stored with the package content in a content cache or processed during download of the package content and stored separately from the content in the caches 112, 113. The current and next caches 112, 113 may be stored in one or more computer-readable media associated with the client 110.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media capable of storing computer-readable media now known or later developed. Computer-readable media should not be construed or interpreted to include any propagating signals.

In one embodiment, the current and next caches 112, 113 are stored in a local memory of the client 110. The local memory can be volatile or non-volatile memory. In another embodiment, the current and next caches 112, 113 are stored in memory accessible over a fast local network.

FIG. 2A illustrates data flow in an operating environment in accordance with an embodiment of the invention. Referring to FIG. 2A, a client having a current cache 210 and a next cache 220 receives a package 230 of content over a network from a server. Data in the package 230 received by the client is first stored in the next cache 220. As illustrated in FIG. 2B, included in the package 230 is the content 231 and a value 232 used to indicate the expiration of data in the current cache 210. Other data 233 may also be included in the package. The value 232 can be stored with the package content 231 in the next cache 220 or processed during download of the package 230 and stored separately from the content stored in the next cache 220. When processing the package, the data of the package can be parsed to determine the value 232.

When the value 232 indicates that the content in the current cache 210 has expired, the content 231 is moved from the next cache 220 to the current cache 210 and new content can be downloaded to the next cache 220.

During the process of moving the content 231 from the next cache 220 to the current cache 210, the "moving" of the content can be accomplished in a variety of ways. In one embodiment, the moving of the content can be a "copy" operation where a copy of the content in the next cache 220 is stored in the current cache 210, resulting in both caches having a same content until the next cache 220 is overwritten. For example, the content can be copied from a first known location (for example, in a registry) to a second known location. The copy-style operation can be performed in cases where the expiration value is stored in a separate location such that old expiration data can remain without affecting the expiration of the content currently in second known location (e.g., for the current cache 210).

In another embodiment, the moving of the content can be a "copy and erase" operation where a copy of the content in the next cache 220 is stored in the current cache 210 and erased from the next cache 220. The copy and erase functionality can be bit-by-bit, word-by-word, line-by-line, or any other suitable operation.

In yet another embodiment, the moving of the content can be a change in pointer. In one such embodiment, the change in pointer can be accomplished by storing a pointer to the memory location that is the "current" location and deriving which is the "next" known location from a set number of known locations. For example, if A and B are known locations, A can be set as the current location (and thus B can be set as the next location), and when the time comes to move the content from the B location to the A location, B can be set as the current location via the pointer, the content in A can be replaced (with the content for the next cache), and upon expiration of the content in B, A can be set as the current location via the pointer.

In another such embodiment, the change in pointer can be accomplished by storing a pointer to the "next" location and the "current" location explicitly. In this case a set number of known locations is not used. Rather, the "current" location can be known location A and the "next" location be known location B such that when the moving from the next location to the current location occurs, the location B can be set as the "current" location, new content can be downloaded, and the pointer for the "next" location can point to an additional location C in which the new content is downloaded and stored.

In certain embodiments, the current cache 210 may be pre-seeded with content 240 during installation of an application. In another embodiment, if the current cache is determined to be empty, the content 231 from the package 230 can be stored in the current cache 210 and new content can be downloaded to the next cache 220 along with the expiration value for the current cache 210.

FIG. 3 shows a method for replacement time based caching in accordance with an embodiment of the invention. As shown in FIG. 3, a client receives a new package 310. The receipt of the new package may occur after content in a next cache is moved to a current cache due to expiration of the content in the current cache. The new package data is stored in the next cache (e.g., 220 of FIG. 2A) and can include new content and an expiration value for the current cache (e.g., content 231 and value 232 shown in FIG. 2B). From the new package data, the prior content expiration is determined 320.

In one embodiment, the new package data provides an amount of time (e.g., number of days, hours, and/or minutes) for the prior content to be valid in a similar fashion as used by the TTL approach; however, instead of the new package data providing expiration for its own content, the expiration amount is used to determine the expiration for the content from a prior package that is currently valid. For example, in one such embodiment, determining the prior content expiration from the new content package data 320 includes reading the expiration amount from the new package data, reading the client system clock at the time of download of the new package data and assigning an expiration of the current cache content as the time of download plus the expiration amount. For example, the expiration amount from the new package data can be 24 hours and the time of download can be 8:30 am on Tuesday, Jan. 3, 2012. Then, the expiration of the current cache content (not the content from the new package data) is determined to be 8:30 am on Wednesday, Jan. 4, 2012.

In another embodiment, the new content package data provides a value that is used to determine the prior content expiration. The value can represent a natural number (but may be in the form of hexadecimal, binary or other base system). Of course, embodiments are not limited to natural number representations.

According to an embodiment, the value provided with the new content package data is used to indicate how many of a predetermined interval of time until the current data is expired. For example, the predetermined interval of time can be a number of minutes, hours or days, such as 24 hours. Then, a value of 1 can indicate, for example, 24 hours from the download time. As another example, the predetermined interval of time can be a number of milestones (e.g., a number of midnights or Tuesdays or other date/time). In one such embodiment, a value of 1 can indicate midnight of the current/first day and a value of 2 can indicate midnight of the next/second day. In many embodiments, a value of 0 can indicate immediate expiration of the current data.

Once the prior content expiration is determined from the new content package data 320, the current content remains valid until, for example, the client system clock indicates that the expiration date/time has occurred. At that time, the current content becomes invalid and the content from the new package is made the current content 330. A next new package provides the expiration for the content that was made the current content in step 330.

The validity of the prior content (e.g., the current content) can be checked during or after specific operations (e.g., a trigger mechanism). For example, the validity of a current content can be checked during a booting/launch phase of an application. If the expiration check indicates that the content is valid, the content is rendered. In one embodiment, the expiration check determines whether the expiration date/time has lapsed by comparing the date/time of the system clock with the date/time of expiration.

When using a trigger mechanism to check the validity of the content, the current content may be used past the expiration date/time until the expiration of the content is checked. For example, when the validity check is performed close to expiration, for example one or more seconds or minutes before expiration, the validity check still indicates that the content is valid and the content will be rendered. The current rendered content can remain during the time between the rendering of the content and the next operation that would cause the validity to be checked, for example upon a reboot or other operation where the content is to be re-rendered.

In one embodiment, only two packages will be stored at a time—one that is providing the current data to be rendered and a second that provides replacement content and the expiration of the current data. In another embodiment, additional packages can be stored, the content of each package being provided with an expiration by a package that followed. In certain cases where more than two packages are stored, a maximum number of packages that are to be received and stored can be established. Priority and/or overwrite processes may be utilized in cases having more than two downloaded packages to ensure that the content is provided to the client in a manner desired by a content provider.

As one example of a priority/overwrite process, a first content A can be downloaded and a second content B can be downloaded (and used to provide the expiration of A). A third content C can be downloaded. The third content C can have an "overwrite" priority such that C replaces B and is used to re-determine the expiration of A. A fourth content D can then be downloaded. The fourth content D may have a "lazy" priority such that D is used to determine the subsequent expiration of C.

As one example of a multi-cached scenario where more than two packages are stored, the expiration determination can take a variety of forms. In one embodiment, two forms of determining the expiration of a prior content may be used. The two forms can be calculating expiration at time of download and calculating expiration at the time when the downloaded content becomes the next content.

As one example of determining the expiration of a prior content, a first content A can be downloaded and a second content B can be downloaded. In one embodiment, B can indicate an expiration of 24 hours and the expiration of A can be set as 24 hours from the time B is downloaded. In a further embodiment, a third content C can be downloaded. With an expiration value from C of 24 hours, the expiration of B can be set as 24 hours from the time C is downloaded or, in another embodiment, the expiration of B can be set as 24 hours from the time B becomes rendered content and C becomes the next to be rendered content. The expiration of A may also alternatively be set as 24 hours from the time A is rendered and B becomes the next to be rendered content.

FIGS. 4A-4D illustrate data flow when performing replacement time based caching in accordance with an embodiment of the invention.

Referring to FIG. 4A, a client computing device 400 includes a current cache 401 and a next cache 402. In operation, a new package sent from a server 410 over a network 420 is received and stored in the next cache 402. New package 430 includes new content Content 2 and data p-expiration related to the expiration of the content Content 1 in the current cache 401. Referring to FIG. 4B, the expiration date for Content 1 stored in the current cache 401 is determined from the p-expiration provided with Content 2 stored in the next cache 402. Content 1 can be rendered so long as it remains valid according to the p-expiration. Referring to FIGS. 4C and 4D, when the Content 1 expires, Content 2 is moved from the next cache 402 to the current cache 401. A new package can then be received as shown in FIG. 4A.

At a time of the expiration of the current content Content 1 (where cache is actively expired) or at a time of a check of the expiration indicating that the expiration date/time of the current content Content 1 has lapsed (where a check is triggered by a specific operation or event), the Content 2 can be moved to the current cache 401. The move can be initiated immediately or at a time the application is idle (e.g., after active processes are completed).

FIG. 5 shows a process flow of a system using replacement time based caching in accordance with an embodiment of the invention. In the embodiment illustrated by FIG. 5, the current cache is referred to as Cache A and the next cache is referred to as Cache B for brevity.

When a client starts (500) either for the first time or after being offline and launches, the current cache Cache A and the next cache Cache B are checked for content (501). The checking of Cache A and Cache B may be performed sequentially or in parallel. When checking Cache A and Cache B (502) results in an indication that the caches are empty, Cache A and Cache B are filled with content (503). In many embodiments, Cache A and Cache B are checked sequentially. In one embodiment, content may be rendered as soon as cache A is determined to have content.

In accordance with certain embodiments of the invention, Cache A content is filled first, either by pre-seeded content or a one-time synchronous call to fill the cache with content. The synchronous call performs the request to the server and receives content from the server. The next step proceeds once the content is received from the server.

If it is determined that Cache B has content while Cache A does not have any content, the content in Cache B is moved to Cache A. Cache B may be filled with content at any time. Cache B may be filled by a request to the server (in a "pull" approach) or the server may push content to the client. In certain embodiments, Cache B is always filled such that cache B does not remain empty and can provide an expiration for cache A content. If the client is not able to connect to the server after content is moved from Cache B to Cache A, then upon connection to the server (either at launch or during use), Cache B is filled with new content and an expiration value is provided for Cache A. The expiration of cache A content is determined using an expiration value provided with the content being stored in Cache B.

When the caches are indicated as having content, the expiration value provided with the content in Cache B is checked (504) to determine if the content in Cache A has expired. When checking the expiration value (504) indicates that the content in Cache A is valid (not expired), then the content in Cache A is rendered (505).

If the expiration value check (504) indicates that the content in Cache A expired, then the content in Cache B is moved from Cache B to Cache A (506) and the content in Cache A moved from Cache B to Cache A is rendered (505).

After the content is moved from Cache B to Cache A (506), Cache B is filled with new content (507), which also provides the expiration value for the content currently in Cache A. The steps 504-507 can continue in a loop until the client stops operations.

Figure 6A:
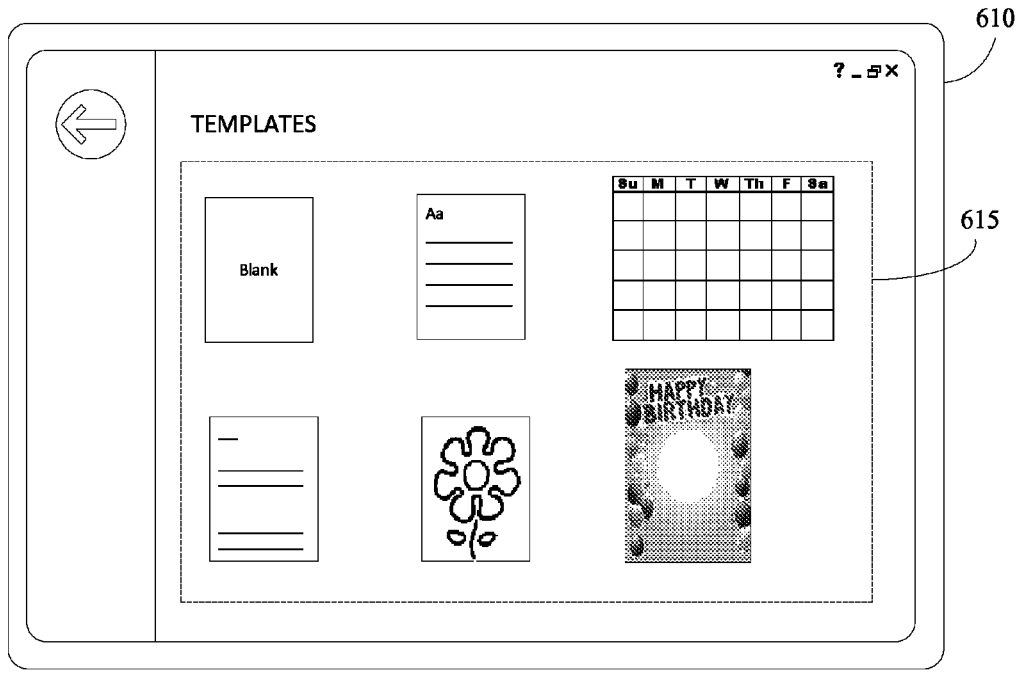
FIGS. 6A and 6B show a representation of an example application utilizing replacement time based caching in accordance with an embodiment of the invention.
Figure 6B:
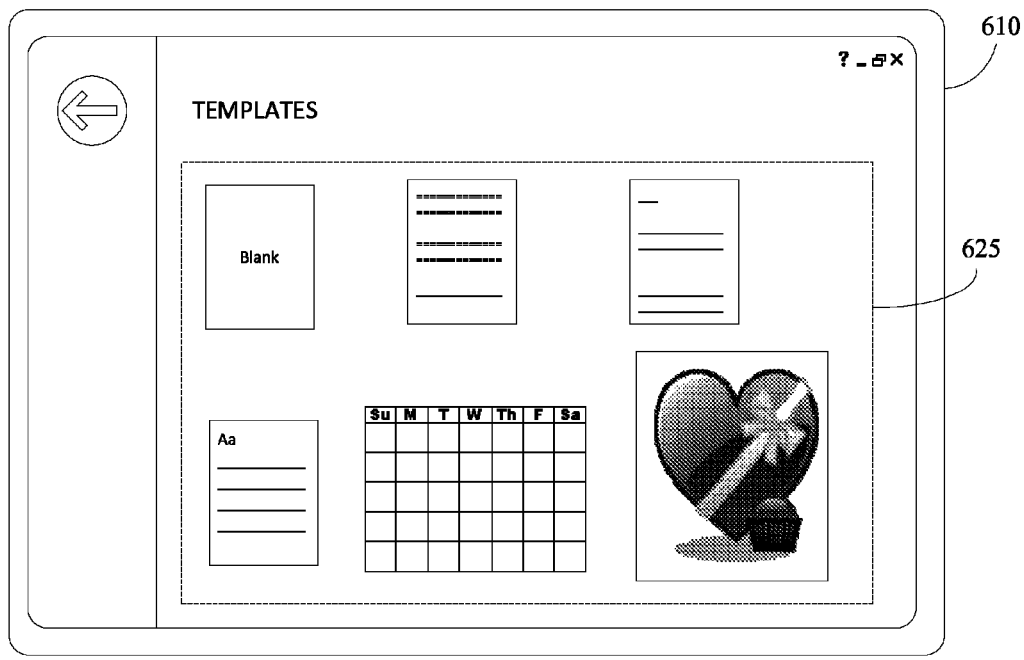

FIGS. 6A and 6B show a representation of an example application utilizing replacement time based caching in accordance with an embodiment of the invention. In the example, a client word processing application includes online content received from a server. The online content may appear to the user upon launch of the word processing application. Because the online content is stored in a cache, the content may also be used offline.

In accordance with embodiments of the invention, two sets of content are present for the client word processing application. The two sets of content include one set of valid content and one set of content for replacing the valid content and that defines the expiration of the valid content. The two sets of content can be stored in two caches: a current cache (for the valid content) and a next cache (for the replacement content). Although two caches are described, more than two caches can be provided. In addition, the two (or more) caches may be stored at different locations of a same memory or storage device or on different memories or storage devices (or a combination thereof).

Referring to FIG. 6A, when a user of a client computing device 610 launches the application to create a new document, a screen or page providing template options may appear to the user. The particular templates 615 shown on the screen or page can include templates that are previously used or automatically cached locally and/or metadata (e.g., the information used to render one or more of the templates 615) stored in the current cache. For an initial launch of an application, the templates 615 may be rendered from pre-seeded content that is provided during installation of the word processing application. During subsequent launching of the application (and after the pre-seeded content has expired), the templates 615 may be rendered from downloaded content moved into the current cache and indicated as valid (not expired) by the next cache.

The templates 615 from content stored in the current cache and rendered for display on the screen of the client computing device 610 can be predictably provided to a user through using replacement time based caching in accordance with an embodiment of the invention.

In accordance with embodiments of the invention, the rendered templates 615 do not define their own expiration. The expiration of the rendered templates 615 is defined by content in the next cache. The content in the next cache stores content that will replace expired content in the current cache. For example, the content in the next cache can define the expiration of the rendered templates 615 by a value indicating that the rendered templates 615 will expire at a next milestone (according to clock time at the client). At that time, the templates 615 expire and the content from the next cache is moved to the current cache and rendered as new templates 625 such as shown in FIG. 6B. When the content from the next cache is moved to the current cache, new content is downloaded from the server and stored in the next cache. The new content downloaded from the server provides the expiration of the new templates 625.

In situations where the client does not connect to the server for an extended period of time and cannot download the new content to fill the next cache, there is no expiration provided for the current content and the content being rendered will be considered valid. Because expiration of current content is provided by the replacement content, the current content will not have an expiration until replacement content arrives. Therefore, valid content will be available even with irregular usage of the client. In addition, a user will perceive that content is turned over at a predictable time, such as a next milestone (such as midnight) experienced by the user (according to the client device) in the example explained above.

Figure 7:
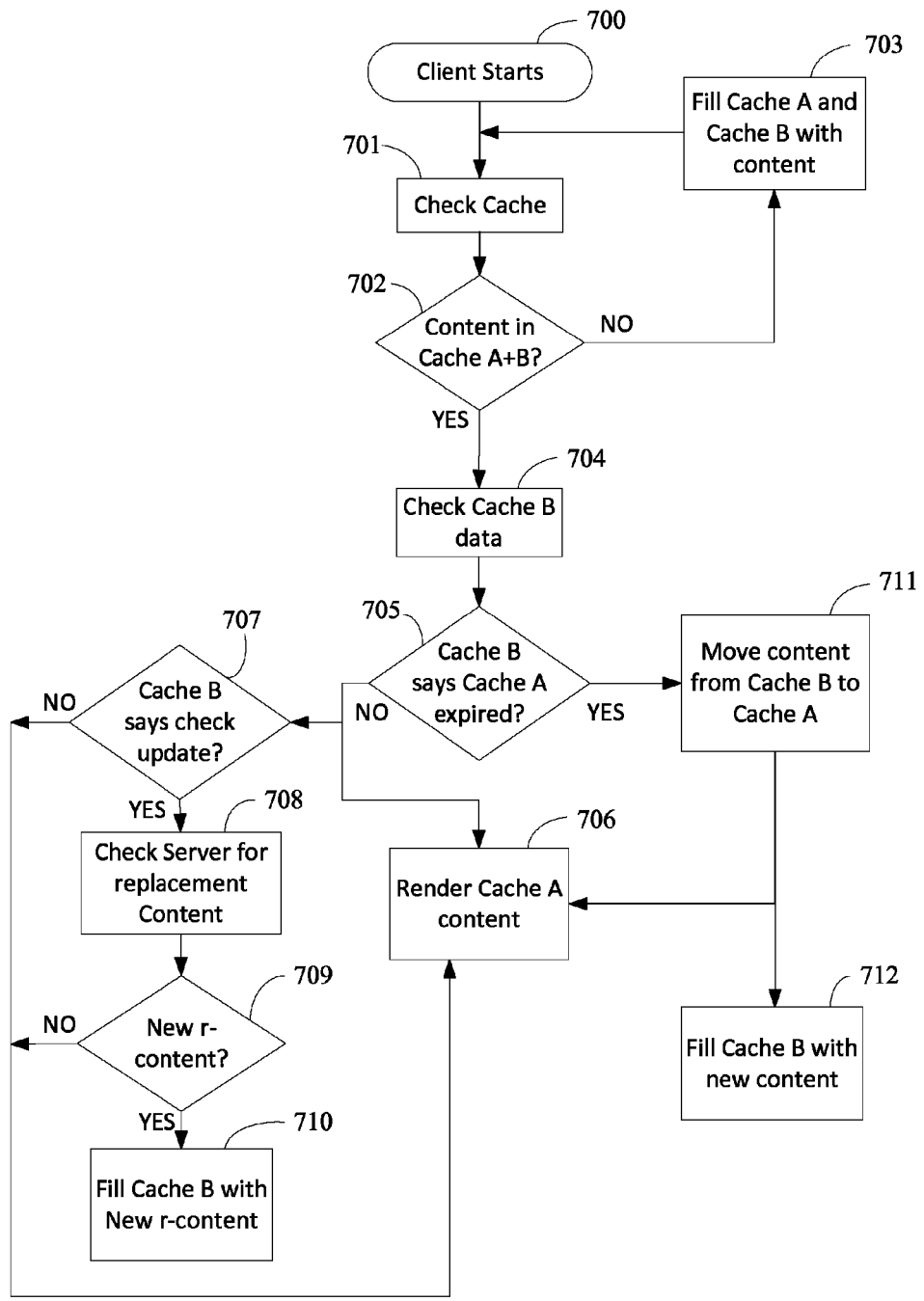
FIG. 7 shows a process flow of a system using replacement time based caching and update check in accordance with an embodiment of the invention.

FIG. 7 shows a process flow of a system using replacement time based caching and update check in accordance with an embodiment of the invention.

Similar to the embodiments described with respect to FIG. 5, when a client starts (700), the current cache Cache A and the next cache Cache B are checked for content 701. The checking of Cache A and Cache B may be performed sequentially or in parallel. When a check of Cache A and Cache B (702) indicates that one or both of the caches are empty, Cache A and Cache B are filled with content (703) to ensure that both Cache A and Cache B have content. In many embodiments, Cache A and Cache B are checked sequentially. In one embodiment, content may be rendered as soon as cache A is determined to have content.

In accordance with certain embodiments of the invention, Cache A content is filled first, either by pre-seeded content or a one-time synchronous call to fill the cache with content.

If it is determined that Cache B has content while Cache A does not have any content, the content in Cache B is moved to Cache A. Cache B may be filled with content at any time. Cache B may be filled by a request to the server (in a "pull" approach) or the server may push content to the client. In certain embodiments, Cache B is always filled such that cache B does not remain empty and can provide an expiration for Cache A content. If the client is not able to connect to the server after content is moved from Cache B to Cache A, then upon connection to the server (either at launch or during use), Cache B is filled with new content and an expiration value is provided for Cache A. The expiration of Cache A content is determined using the expiration value provided with the content being stored in Cache B.

Once it is confirmed that there is content in the caches (702), Cache B data is checked (704). From the Cache B data, the expiration value is checked (705) to determine if the content in Cache A has expired. When checking the expiration value (705) indicates that the content in Cache A is valid (not expired), then the content in Cache A is rendered (706).

In the embodiment shown in FIG. 7, Cache B data also includes a value indicating a date or time for checking whether there is new replacement content that should take the place of the content currently in Cache B. This checking value can be provided as part of the other data 233 as shown in FIG. 2B.

The update check of the process shown in FIG. 7 facilitates the replacement of potentially un-useful or outdated next/replacement content while the current cache is still valid according to a "pull" style model. In this pull style embodiment, the checking value is smaller than the expiration value so that the update check occurs while the content in Cache A is still valid. If the checking value indicates that it is time to check for updates (707), the server is checked for replacement content (708). If the server indicates that there is replacement content (r-content) (709), the content in Cache B can be replaced (710) with the r-content.

In another embodiment, a "push" style model may be used. In one such embodiment, a client can register to receive notifications from a server in case content is to be replaced. For example, the client can receive a notification that Cache B content needs to be updated and then the client is provided with (or requests and receives) replacement content to store in Cache B.

In many embodiments, only the r-content is provided and the expiration value for Cache A is not updated. In one embodiment, a new expiration value for Cache A may be provided. In certain embodiments, a checking value is provided with the r-content so that the server is checked again. In other embodiments, the checking value provided with the content in Cache B is used again if there is enough time between checking and Cache A expiration.

FIGS. 8A-8G provide an example of one such case by illustrating data flow when performing replacement time based caching and update check in accordance with an embodiment of the invention.

Figure 8A:
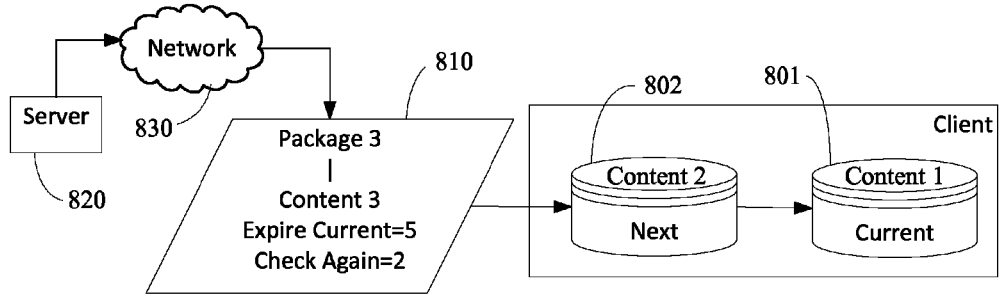
FIGS. 8A-8G illustrate data flow when performing replacement time based caching and update check in accordance with an embodiment of the invention.
Figure 8B:
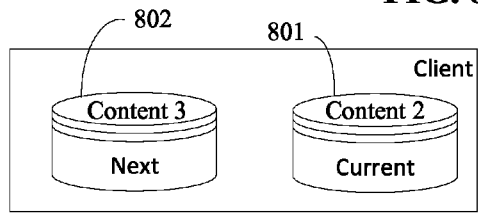

FIG. 8A shows data flow upon the expiration of the Content 1 in the current cache 801. When Content 1 is indicated as expired by the expiration date provided from the next cache data, the Content 2 from the next cache 802 is moved to current cache and new content (Content 3) from new package 3 810 is received from a content server 820 over the network 830 and stored in the next cache 802 as shown in FIG. 8B. Package 3 810 also includes an expiration value (Expire Current) for the content in the current cache (Content 2) and a check again value (Check Again) for the content in the next cache (Content 3). In the example, the expiration value Expire Current=5 and the check again value Check Again=2. In one embodiment, Expire Current=5 can provide an expiration time of the end of 5 days for Content 2 in the Current cache 801 and Check Again=2 provides an update check at the end of 2 days for Content 3 in the next cache 802.

Figure 8C:
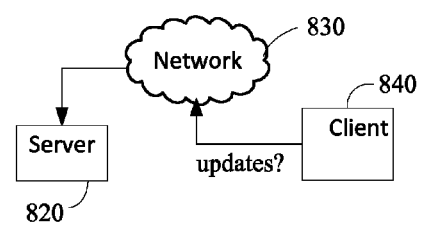
Figure 8D:
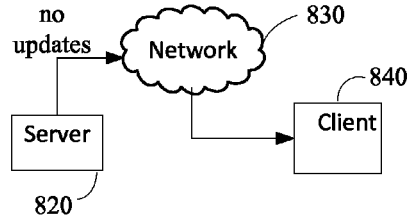
Figure 8E:
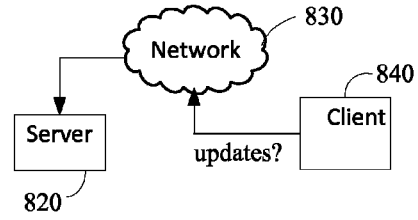
Figure 8F:
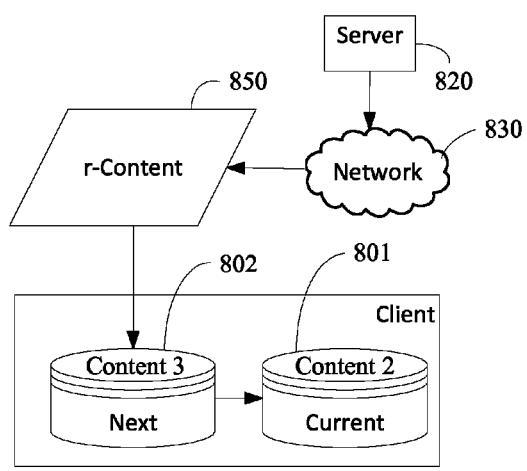

Referring to FIG. 8C, at the end of 2 days, a request is sent from the client 840 to the server 820 to determine if there is replacement content. Referring to FIG. 8D, there may be no updates at the server 820 at the date/time the request is sent. A new value for Check Again may be sent by the server 820 in response to the update check or the Check Again value from Package 3 810 may be maintained. In the example, since Content 2 in the current cache 801 is still valid at the end of day 4 (Check Again=2), a request is sent from the client 840 to the server 820 to determine if there is replacement content as shown in FIG. 8E. Referring to FIG. 8F, there may be an update available at the server 820. In this case, replacement content (r-content) 850 having the update is received from the server 820 over the network 830 and stored in place of the Content 3 in the next cache 802 as shown in FIG. 8G.

Figure 8G:
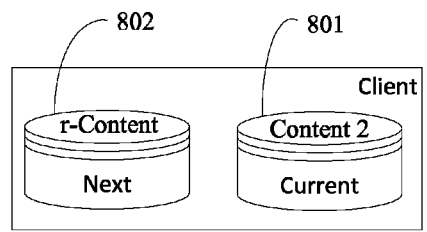

Returning to FIG. 7, if the expiration value check (705) indicates that the content in Cache A expired, then the content in Cache B (whether the originally provided content to Cache B or the new replacement content such as shown in FIG. 8G) is moved from Cache B to Cache A (711), and the content in Cache A that was originally in Cache B is rendered (706). For the example shown in FIGS. 8A-8G, at the end of 5 days (based on Expire Current=5), Content 2 in the current cache 801 expires, and the r-content is moved from the next cache 802 into the current cache 801.

After the content is moved from Cache B to Cache A 711, Cache B is filled with new content 712, which also provides the expiration value for the content currently in Cache A (and a checking value). The steps 704-712 can continue in a loop until the client stops operations.

In accordance with embodiments of the invention, when a client application renders cached content, the application checks to see if the expiration defined by the content in the next cache (which is not being rendered) has been reached/lapsed. If the expiration has been reached/lapsed, the content in the next cache (e.g., Cache B) is moved to the current cache (e.g., Cache A) and immediately rendered. New content is then downloaded to fill the next cache (e.g., Cache B) and define the expiration for the content formerly in the next cache but now in the current cache (e.g., the content moved from Cache B to Cache A).

By using the systems and methods described herein, a user's perception that that content turned over at a predictable time ("overnight/over midnight") can be maintained. Unexpired/valid content will be available to replace the expired content because content does not expire until the replacement content is downloaded (since the replacement content defines the expiration).

As previously mentioned, TTL caching or a time of expiration approach is often used to turn over into new content. TTL caching can result in content expiring at an inopportune time based on when it was first downloaded/became valid and can allow for content to potentially expire at a time when a client is not running and/or there isn't any new content to replace it when the client is launched. For example, a TTL cached content may have a time of 60 minutes for the content being downloaded to be valid before expiring. Then, the TTL cached content will expire at download time+60 minutes, which may not be convenient for a user who would like to return to the content 65 minutes later. Once the content expires, the client must wait for new content or the client must render old content while it retrieves new content and then make a switch over to the new content at what may be an inopportune time.

The time of expiration approach has similar problems. The time of expiration approach sets a particular date and time after which the content is considered expired/invalid. This allows for content to be turned over at a logical time given regular usage of the client, but breaks down when content expires at a time when a client is not running and/or there isn't any new content to replace it when the client is launched.

This can mean that the client must wait for new content or that the client must render old content while it retrieves new content and then make a switch over to the new content at an inopportune time. For example, a time of expiration approach may set a date of January $3^{rd}$ at 11:59 pm for content to expire. However, if a client is not running because a user is on a vacation for the week after New Year's Day, the content will have been expired by the time the client is run again. In this case, the old content may be rendered while new content is retrieved or, in some cases, no content will be rendered until the new content is retrieved.

In another scenario, even where a second (or more) set of content is downloaded, but each downloaded content indicates its own expiration, similar issues can arise when a client is not run before the latest of the expiration dates pass. For example, a first set of content stored in one cache and indicating its own expiration of January $3^{rd}$ at 11:59 pm and a second set of content stored in another cache and indicating its own expiration of January $4^{th}$ at 11:59 pm will have a same issue as the above example if a user is on vacation for the week after New Year's Day.

In contrast, accordance with various embodiments of the invention, a user's experience does not involve expired content in which a client must wait for new content or the client must render old content while the client retrieves new content and then makes a switch over to the new content at an inopportune time.

Certain techniques set forth herein may be described in the general context of computer-executable instructions, such as program modules, executed by one or more computers or other devices. Certain embodiments of the invention contemplate the use of a computer system or virtual machine within which a set of instructions, when executed, can cause the system to perform any one or more of the methodologies discussed above. Generally, program modules include routines, programs, objects, components, and data structures that perform particular tasks or implement particular abstract data types.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Any reference in this specification to "one embodiment," "an embodiment," "certain embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated within the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method of providing server-hosted content on a client device, the method comprising:
   receiving a prior package;
   receiving a subsequent package;
   storing a current content received with the prior package in a current cache associated with a client application;
   storing a next content received with the subsequent package in a next cache associated with the client application; and
   assigning an expiration time to the current content received with the prior package using a read value received with the next content of the subsequent package.

2. The method of claim 1, further comprising:
   rendering the current content; and
   moving the next content to the current cache after the expiration time for the current content is reached or passes.

3. The method of claim 2, further comprising:
   receiving, after the subsequent package, a third package comprising a third value and a third content;
   assigning an expiration time for the next content stored in the current cache by using the third value; and
   rendering the next content stored in the current cache.

4. The method of claim 2, further comprising checking a content server for replacement content for the next content before the expiration time for the current content is reached or passes.

5. The method of claim 1, wherein assigning the expiration time to the current content received with the prior package using the read value received with the next content of the subsequent package comprises:
   setting the expiration time for the current content received with the prior package as a number of milestones multiplied by the read value.

6. The method of claim 1, wherein the read value indicates an amount of time until the current content expires, wherein assigning the expiration time to the current content received with the prior package using the read value received with the next content of the subsequent package comprises:
   setting the expiration time for the current content received with the prior package to a time the prior package was received plus the read value.

7. The method of claim 1, wherein the read value indicates a day and time for the current content to expire, wherein assigning the expiration time to the current content received with the prior package using the read value received with the next content of the subsequent package comprises:
   setting the expiration time for the current content received with the prior package to the day and time for the current content to expire indicated by the read value.

8. A computer-readable device having instructions stored thereon that when executed by a computing device cause the computing device to perform a method comprising:
   instantiating a client application comprising two caches associated therewith;
   rendering a first content stored in a first cache of the two caches associated with the client application;
   storing a next content in a second cache of the two caches associated with the client application, the next content being received after the first content; and
   maintaining the first content associated with the client application as valid until an expiration time for the first content is determined to lapse, wherein a next expiration information included with the next content provides the expiration time for the first content.

9. The device of claim 8, wherein the method further comprises:
   moving the next content to the first cache after the expiration time lapses;
   storing a third content in the second cache, the third content being received after the next content, wherein a third expiration information included with the third provides a next expiration time for the next content; and
   rendering the next content stored in the first cache.

10. The device of claim 8, wherein the next expiration information included with the next content comprises an expiration value for the first content,
    wherein maintaining the first content associated with the client application as valid until the expiration time for the first content is determined to lapse comprises:
    setting the expiration time for the first content as a number of milestones multiplied by the expiration value; and
    checking the expiration time to determine whether the expiration time has been reached, a result that the expiration time has been reached indicating that the expiration time has lapsed and a result that the expiration time has not been reached indicating that the first content is valid.

11. The device of claim 8, wherein the next expiration information included with the next content comprises an expiration value for the first content, the expiration value indicating an amount of time,
    wherein maintaining the first content associated with the client application as valid until the expiration time for the first content is determined to lapse comprises:
    setting the expiration time for the first content to a time the next content is received plus the amount of time indicated by the expiration value; and
    checking the expiration time to determine whether the expiration time has been reached, a result that the expiration time has been reached indicating that the expiration time has lapsed and a result that the expiration time has not been reached indicating that the first content is valid.

12. The device of claim 8, wherein the next expiration information included with the next content comprises an expiration value for the first content, the expiration value indicating a day and time,
    wherein maintaining the first content associated with the client application as valid until the expiration time for the first content is determined to lapse comprises:
    setting the expiration time for the first content to the day and time indicated by the expiration value; and
    checking the expiration time to determine whether the expiration time has been reached, a result that the expiration time has been reached indicating that the expiration time has lapsed and a result that the expiration time has not been reached indicating that the first content is valid.

13. The device of claim 8, wherein the method further comprises checking a content server for replacement content for the next content before the expiration time for the first content lapses.

14. A system for replacement time-based caching, the system comprising:
   one or more memory devices;
   a current cache stored on the one or more memory devices;
   a next cache stored on the one or more memory devices; and
   a processor coupled to the one or more memory devices, the processor operating to:
      instantiate a client application, the current cache and the next cache being associated with the client application;
      render a first content stored in the current cache; and
      maintain the first content as valid until an expiration time for the first content is determined to lapse, wherein a next expiration information included with a next content stored in the next cache provides the expiration time for the first content.

15. The system according to claim 14, wherein the processor is further operating to:
   store the next content in the current cache when the expiration time for the first content is determined to lapse;
   store a third content in the next cache, wherein a third expiration information included with the third content provides a next expiration time for the next content; and
   render the next content stored in the current cache.

16. The system according to claim 15, wherein to maintain the first content as valid until the expiration time for the first content is determined to lapse, the processor operates to:
   set the expiration time for the first content using the next expiration information included with the next content, wherein the next expiration information comprises an expiration value for the first content; and
   check the expiration time to determine whether the expiration time has been reached, a result that the expiration time has been reached indicating that the expiration time has lapsed and a result that the expiration time has not been reached indicating that the first content is valid.

17. The system according to claim 16, wherein to set the expiration time for the first content using the next expiration information included with the next content, the processor operates to:
   set the expiration time for the first content as a number of milestones multiplied by the expiration value.

18. The system according to claim 16, wherein the expiration value indicates an amount of time,
   wherein to set the expiration time for the first content using the next expiration information included with the next content, the processor operates to:
   set the expiration time for the first content to a time the next content is received plus the amount of time indicated by the expiration value.

19. The system according to claim 16, wherein the expiration value indicates a day and time,
   wherein to set the expiration time for the first content using the next expiration information included with the next content, the processor operates to:
   set the expiration time for the first content to the day and time indicated by the expiration value.

20. The system according to claim 14, wherein the processor is further operating to check a content server for replacement content for the next content before the expiration time for the current content is determined to lapse.

* * * * *